No. 816,892. PATENTED APR. 3, 1906.
C. M. WASLEY.
ATTACHMENT FOR CULINARY VESSELS.
APPLICATION FILED APR. 27, 1905.
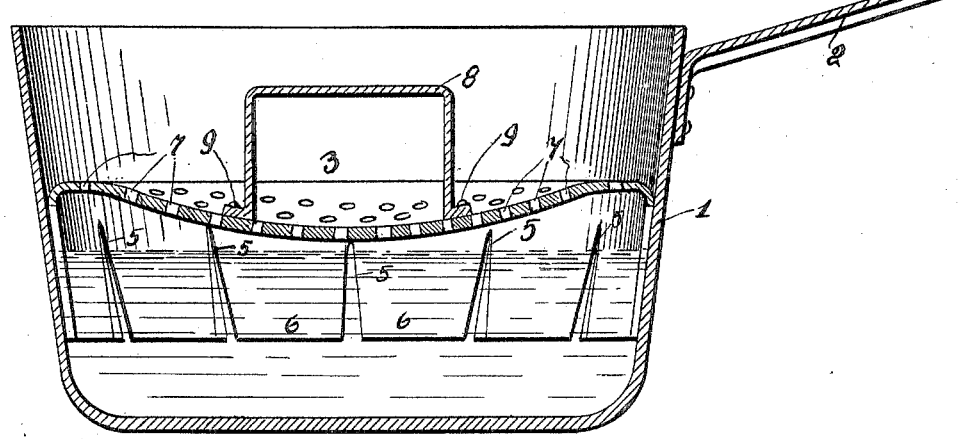
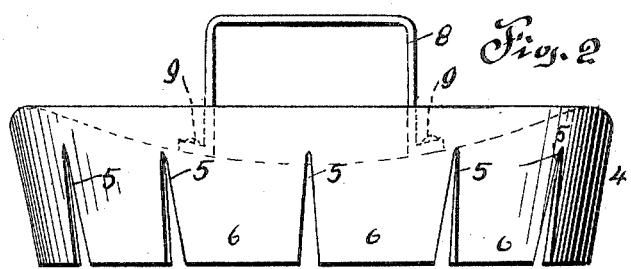
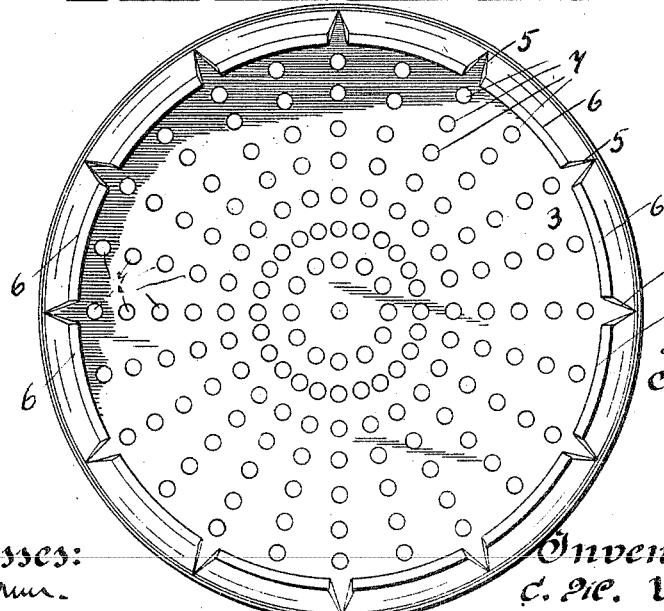
Witnesses:
Inventor.
C. M. Wasley.

UNITED STATES PATENT OFFICE.

CORA MAY WASLEY, OF EMPIRE, OHIO.

ATTACHMENT FOR CULINARY VESSELS.

No. 816,892.     Specification of Letters Patent.     Patented April 3, 1906.

Application filed April 27, 1905. Serial No. 257,663.

*To all whom it may concern:*

Be it known that I, CORA MAY WASLEY, a citizen of the United States of America, residing at Empire, in the county of Jefferson and State of Ohio, have invented certain new and useful Improvements in Attachments for Culinary Vessels, of which the following is a specification, reference being had therein to the accompanying drawings.

This invention relates to certain new and useful improvements in attachments for culinary vessels; and the invention has for its object to provide an attachment for supporting vegetables and the like eatables in a culinary vessel, whereby they may be steamed without contacting with the contents of the culinary vessel.

Another object of this invention is to provide an adjustable attachment for culinary vessels which is applicable to various sizes of vessels.

The attachment is extremely simple in construction, strong and durable, comparatively inexpensive to manufacture, and highly efficient for steaming vegetables and the like eatables.

Briefly described, my improved attachment conforms substantially to a lid having depending resilient sides which are sheared, whereby the attachment can be positioned within a culinary vessel and supported therein by the frictional contact of the depending sides of the attachment with the sides of the culinary vessel.

The top of the attachment is provided with a plurality of apertures and with a suitable handle.

The attachment is adapted to support vegetables to be steamed in close proximity to the contents of the culinary vessel in connection with which it is used.

The above construction will be hereinafter more fully described and then specifically pointed out in the claim, and, referring to the drawings accompanying this application, like numerals of reference designate corresponding parts throughout the several views, in which—

Figure 1 is a vertical sectional view of a culinary vessel equipped with my improved attachment. Fig. 2 is a side elevation view of the attachment, and Fig. 3 is a bottom plan view of the same.

In the accompanying drawings, I have illustrated one form of culinary vessel in connection with which my improved attachment can be used, the vessel illustrated representing a boiler 1, having a suitable handle 2.

My improved attachment comprises a plate 3, having depending sides 4, which are sheared, as indicated at 5, to provide resilient depending members 6. The plate 3 is provided with a plurality of circularly-arranged apertures 7, and centrally of said plate I provide a suitable handle 8, which is riveted or otherwise secured, as indicated at 9, to the top of the plate 3.

In Fig. 1 of the drawings it will be observed that the culinary vessel 1 has tapering sides and that I have illustrated the vessel as being partially filled with water. When my improved attachment is placed within the vessel, the depending resilient members 6 of the attachment are adapted to frictionally engage the tapering sides of the culinary vessel and retain the plate 3 above the height of the water within said vessel, permitting sufficient space to exist for the steam generated by the boiling of the water to pass upwardly through the apertures 7 of the plate 3 and contact with vegetables or other eatables lying upon the top of the attachment.

In the accompanying drawings I have illustrated the attachment as being circular in contour; but I do not care to confine myself to the specific shape of the attachment, as it may be made to fit suitable culinary vessels.

The attachment may also be made of a sufficient size to be used in connection with boilers for steaming clothes, and while I have herein illustrated the preferred manner of constructing my improved attachment it is obvious that various changes may be made in the details of construction without departing from the general spirit and scope of the invention.

What I claim, and desire to secure by Letters Patent, is—

In an attachment of the character described, the combination with a suitable boiler, of a concavo-convex plate having a plurality of small openings extending substantially over the entire surface of the plate, the edges of said plate being bent downwardly and sheared to form resilient members adapted to frictionally engage the sides of said boiler, and a handle rigidly mounted upon the upper side of said plate centrally thereof, substantially as described.

In testimony whereof I affix my signature in the presence of two witnesses.

CORA MAY WASLEY.

Witnesses:
E. S. MINOR,
MARY E. MINOR.